Figure 1:
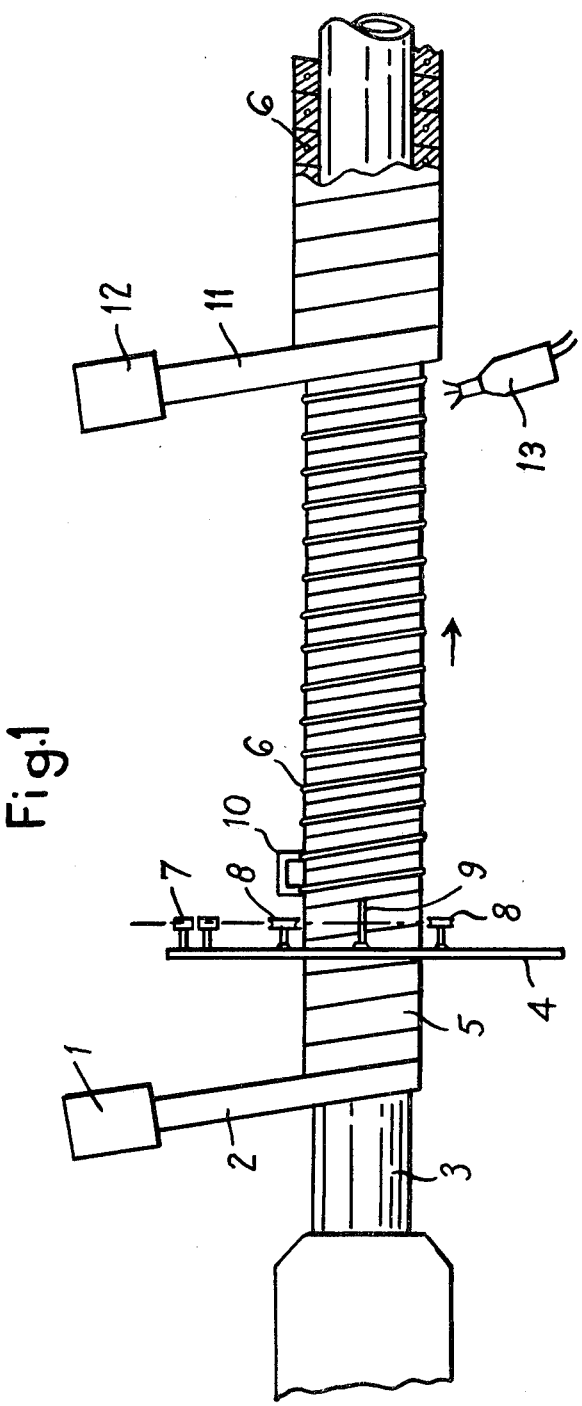

United States Patent [19]

Anselm

[11] Patent Number: 4,459,168
[45] Date of Patent: Jul. 10, 1984

[54] METHOD AND APPARATUS FOR FORMING WIRE REINFORCED HOSE

[76] Inventor: Anthony C. Anselm, via Ai Ronchi 11, 6948 Porza, Lugano, Switzerland

[21] Appl. No.: 510,843

[22] Filed: Jul. 5, 1983

Related U.S. Application Data

[63] Continuation of Ser. No. 291,674, Aug. 10, 1981, abandoned.

[30] Foreign Application Priority Data

Aug. 8, 1980 [GB] United Kingdom ............... 8025998

[51] Int. Cl.³ .................................................. B65H 81/00
[52] U.S. Cl. ................................. 156/143; 156/195; 156/244.13; 156/429; 156/432
[58] Field of Search ........... 156/143, 144, 195, 244.13, 156/428, 429, 430, 431, 432, 443

[56] References Cited

U.S. PATENT DOCUMENTS

| | | | |
|---|---|---|---|
| 2,748,805 | 6/1956 | Winstead | 156/195 |
| 3,271,064 | 9/1966 | Hall | 156/143 |
| 3,536,559 | 10/1970 | Pelley et al. | 156/143 |
| 3,623,929 | 11/1977 | Wannamaker et al. | 156/195 |
| 3,671,359 | 6/1972 | Sawada et al. | 156/436 |
| 3,962,019 | 6/1976 | Reieski | 156/143 |
| 4,104,097 | 8/1978 | Gregory et al. | 156/143 |
| 4,196,031 | 4/1980 | Lalikos et al. | 156/143 |
| 4,203,476 | 5/1980 | Vitellaro | 156/143 |
| 4,351,682 | 9/1982 | McGuire | 156/143 |

FOREIGN PATENT DOCUMENTS

| | | |
|---|---|---|
| 1943549 | 8/1969 | Fed. Rep. of Germany . |
| 2334606 | 10/1975 | France . |
| 494478 | 7/1953 | United Kingdom . |
| 739668 | 3/1954 | United Kingdom . |
| 1171174 | 11/1969 | United Kingdom . |

Primary Examiner—Michael W. Ball
Attorney, Agent, or Firm—Biebel, French & Nauman

[57] ABSTRACT

A hose or pipe comprising a tubular layer formed by helically winding plastics material and/or rubber around a mandrel reinforced with a high tensile spring steel wire which is formed into a helix around and simultaneously with the winding of the tubular layer by positively driving the wire into engagement with coil-forming means, disposed around the tubular layer, which gives the wire a set and produces a wire helix having an internal diameter approximating the external diameter of the tubular layer, the wire being driven into the coil-forming means at a linear speed substantially equal to the speed of the surface of the helical path around the tubular layer against which the wire coil is to lie.

11 Claims, 4 Drawing Figures

METHOD AND APPARATUS FOR FORMING WIRE REINFORCED HOSE

This is a continuation of application Ser. No. 291,674 filed Aug. 10, 1981 now abandoned.

Field of the Invention

This invention relates to hoses and pipes made of plastics material and/or rubber (natural or synthetic) and reinforced by a helical coil of spring metal wire, and to a method of and apparatus for manufacturing such hoses and pipes.

Prior Art

Considerable developments have taken place in connection with the manufacture of hoses and pipes made of extruded plastics material, particularly PVC, which are reinforced with a helical coil of a harder grade of plastics material. Examples of such hoses are described in GB Pat. Nos. 984247, 1144046 and 1171174. Other constructions are known, see for example GB Pat. Nos. 739668, 769993 and 1054711, U.S. Pat. Nos. 4196031 and 3671359, DE Pat. Nos. 1629554, FR Pat. No. 2334606 and CH Pat. No. 358045, in which a pipe or hose of plastics material and/or rubber is reinforced by a helical coil of plastics material or metal wire wound therearound and optionally covered with one or more layers of plastics, textile fabrics, wire braidings or other materials. In such constructions, the material of the helix has been relatively flexible, or softenable by heat, so that it could be wound around the hose material by simply pulling it from a bobbin by the tension in the wire being wound on to the surface of the hose while it is being rotated. In U.S. Pat. No. 4196031 the wire, as it is pulled off the bobbin is also pulled through a coiling spool by the frictional grip between the wire and the hose. Another construction is described in DE Pat. No. 1943549 in which the wire is helically wound directly around and in contact with a mandrel and a plastic strip is helically wound over the wire to form the hose body. The wire is fed to the mandrel via a pre-bending device and the speed ratio between the feed speed and the winding speed is adjustable.

Summary of the Invention

The present invention is directed to the reinforcing of hoses and pipes with high tensile spring steel wire formed as a helix around a tubular layer of plastics material and/or rubber. By "spring metal wire" is meant a high tensile wire, particularly of steel, which cannot be wound around and against the tubular layer in heat-softened or hot metal condition, by the friction between the tubular layer and the wire, without damaging or cutting through the tubular layer. The high tensile wire used in this invention could have a tensile strength of the order of 160kg/cm$^2$. The hose or pipe can be further reinforced or protected by additional laminations of plastics material, textile fabrics, wire braiding and/or rubber.

From one aspect, the present invention consists in a method of making a hose or pipe comprising a tubular layer of plastics material and/or rubber which is reinforced by a helical coil of spring metal wire therearound, characterized by forming the helical coil of spring metal wire by positively driving the wire lengthwise into engagement with coil-forming means disposed around a mandrel supporting said tubular layer and including means for putting a set into the wire, during coil formation, to form a helical spring wire coil having an internal diameter approximating the external diameter of said layer, the tubular layer being rotated and moved axially relative to the coil-forming means during coil formation and the wire being driven into the coil-forming means at a linear speed substantially equal to the speed of movement, relative to the coil-forming means, of the surface of the layer against which the wire coil is deposited.

The method can be applied to the reinforcing of hoses and pipes produced on a long mandrel by subsequently applying the helical coil of high tensile spring wire therearound in the manner above indicated. The hoses thus produced are of definite length and a feature of the invention consists in using the method for producing hoses or pipes of indefinite length. To this end, the method consists in forming the hose or pipe layer by helically winding a strip of plastics material and/or rubber around a rotating mandrel means along which the helically formed hose layer is axially advanced with adjacent turns abutting and bonded together, or later to be bonded or vulcanised together, and simultaneously forming a helical core of spring metal wire around the said wound hose layer by positively driving the wire into engagement with coil-forming means disposed around the hose layer and including means for flexing the wire, while moving during coil formation, to a curvature greater than that of the external curvature of the wound layer, whereby the wire is given a set and the formed metal wire helix has an internal diameter approximating the external diameter of the wound hose layer, the wire being driven into the coil forming means at a linear speed substantially equal to the speed of the surface of the helical path around the hose layer against which the wire coil is to lie.

Further features of the invention consist in the apparatus for carrying out the method, and in the novel hoses and pipes, reinforced by high tensile steel wire, as herein described.

Figure 2:
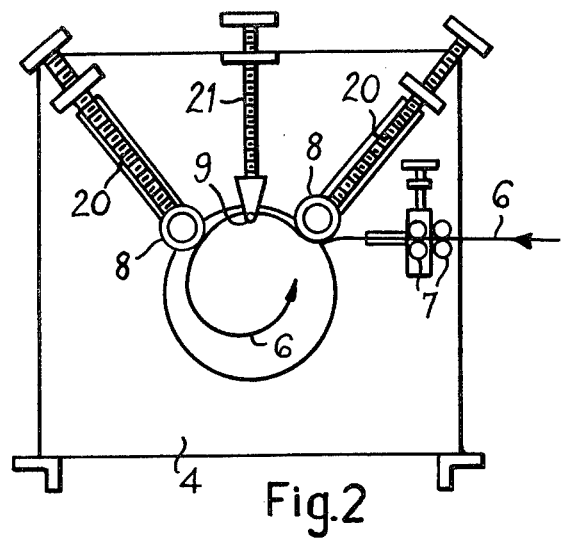
Figure 4:
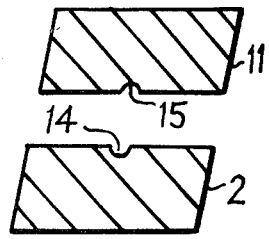
Figure 3:
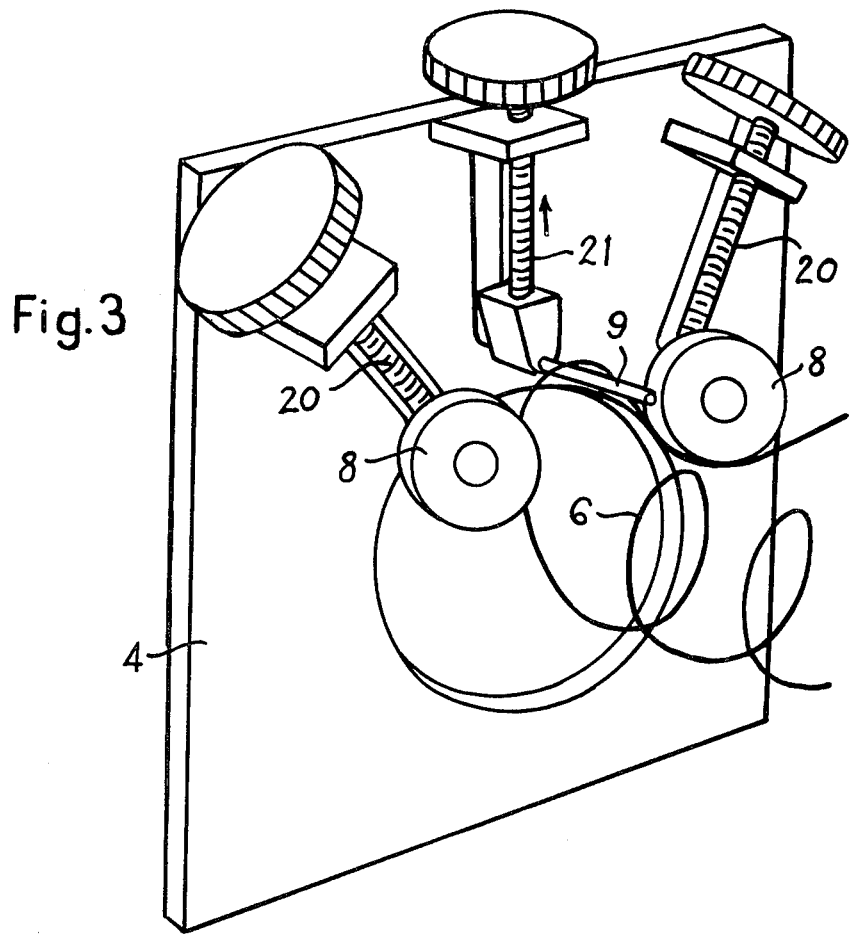

In order that the invention may be more clearly understood, reference will now be made to the accompanying drawings, in which:

FIG. 1 is a diagrammatic view of one form of apparatus according to the invention, FIG. 2 is a view of an embodiment of coil-forming means, FIG. 3 is a diagrammatic perspective view of FIG. 2, and FIG. 4 shows profiles of the plastic strips.

The invention will be described by way of example with reference to the manufacture of a hose or pipe having a tubular layer of plastics material and/or rubber formed by helically winding a strip of the material, of the appropriate profile, on to a rotating mandrel which is adapted to advance the wound layer axially along the mandrel to be discharged from the free end of the mandrel. As shown in FIG. 1, a plastics material, such as PVC, is extruded through the extruder nozzle 1 in the form of a strip 2 of appropriate profile and is helically wound around the rotating mandrel 3 which is constructed in any suitable manner so that the wound layer is axially advanced towards the right as it is being wound. Such mandrel constructions are known in the art (see for example British specification No. 1171174). Adjacent turns may be bonded together by rollers (not shown) or in any other appropriate manner while the plastic is still in the hot melt condition. It may be cooled by a water jet (not shown). Around the mandrel is a support plate 4 having a central aperture through which the wound hose layer 5 passes. On this plate are mounted coil-forming means for producing from high tensile steel wire 6 a wire coil having an internal diameter approximating the external diameter of the hose layer 5. One embodiment of the coil-forming means is more clearly shown in FIGS. 2 and 3. The steel wire 6 is positively driven by power-driven rollers 7 into a series of coil-forming rollers 8, disposed around the mandrel and of which the radial position may be adjusted by screws 20. The coil-forming rollers 8 may be two or more in number and are formed with peripheral grooves which guide the wire 6, successive rollers 8 being axially displaced according to the pitch of the wire coil to be formed. Their axial positions may be adjustable. In order that the formed wire coil may have an internal diameter which is smaller than that which would normally be produced by the forming rollers 8, the coil-forming means includes a device 9 disposed between a pair of forming rollers 8 which engages the inner periphery of the wire 6 and flexes the wire radially outwardly from its normal curvature produced by the rollers 8, thereby flexing the wire to a greater curvature (smaller radius of curvature) and imparting to it a set so that the formed coil will have the desired diameter approximating that of the external diameter of the hose layer 5. The device 9, shown in FIG. 3 as a kind of peg but can be otherwise shaped, is radially adjustable by a screw 21. The wire 6 is driven by the drive rollers 7 at a linear speed which is so co-related with the speed of rotation of the hose layer 5 that the formed metal wire coil will be deposited against the hose layer along a helical path with a pitch corresponding to that of the turns of the hose layer. Forked members 10 may be provided to engage one or more turns of the formed coil to maintain the desired pitch.

The hose layer with the helical coil of high tensile wire around its surface may be covered with another helical layer of plastics material formed by a strip 11 of plastics material and/or rubber extruded through an extrusion nozzle 12 and bonded to the surface of the inner layer 5. To facilitate this, the outer surface of the layer 5 may be heated and softened by hot air jets as diagrammatically indicated at 13. Appropriate pressure rollers may be provided as necessary to ensure good bonding.

If desired, the strip 2 forming the layer 5 may be profiled with an external groove 14, for example as shown in FIG. 4 in which the helical wire coil is adapted to lie. The outer covering layer 11 may also be profiled with a groove 15 along its inner surface, which is bonded to the layer 5 as shown in FIG. 4.

The inner and outer layers 5,11 may be of the same grade of plastics material or the layers may be made of different grades of material or of different materials, for example the layer could be formed of an oil-resistant nitrate rubber PVC compound for axial strength and a cheaper PVC compound can be wound outside the steel spring. Alternatively, polyurethane non-toxic material or anti-abrasive based lining, including textile reinforcement could form the outer layer around the wire helix. A second high tensile steel helix could be externally applied downstream of the first coil-forming means to give further mechanical reinforcement. Layers of textile fabric or other material may be wound around the hose or incorporated therein to produce a laminated hose, as known in the art.

Where the hose comprises or incorporates a layer or layers of rubber, it may be vulcanised continuously during production of the hose or pipe, for example by microwave energy, salt bath or fluidised bed of heated particles.

The hoses and pipes reinforced with high tensile wire according to this invention have a high anti-crush loop strength.

The high tensile wire may have a covering of plastic material or otherwise treated to obtain a good bond with the plastic material and/or rubber forming the adjacent tubular layer or layers of the hose. Such a covering also inhibits the metal wire from cutting through the hose layers.

The hose layers may comprise a rigid grade of PVC, propylene or other plastic, thus producing a reinforced pipe which is substantially rigid, highly crush-resistant and having increased bursting pressure.

The high tensile wire may have any desired cross section. For example it may have a flat section.

I claim:

1. A method of making a hose or pipe comprising a tubular layer of a material selected from plastics material, natural rubber and synthetic rubber which is reinforced by a helical coil of spring metal wire therearound, comprising the steps of:

(a) extruding a strip of said material,
    (b) winding said extruded strip helically around mandrel means with adjacent turns touching to form a tubular layer,
    (c) forming a helical coil of spring metal wire concentrically around said tubular layer by positively driving the wire lengthwise into engagement with coil-forming means including at least two spaced roller means disposed around the mandrel means and entirely outside the internal diameter of the coil to be formed, and pulling outward against the inner periphery of the wire passing between the roller means to put a set into the wire during coil formation, and thereby to form a helical spring wire coil having an internal diameter approximately the external diameter of said layer, rotating and axially moving the tubular layer relative to the coil-forming means during coil formation and depositing the turns of the wire coil along a helical path on the external surface of said tubular layer, and
    (d) controlling the linear speed at which the wire is positively driven into the coil forming means so that the wire coil is laid down lightly along said helical path against the external surface of the still soft extruded strip forming the tubular layer, as it rotates and moves axially relative to the coil-forming means, without cutting through the soft material of the extruded strip.

2. The method according to claim 1, characterised by helically winding one or more layers of textile fabric or other reinforcing material around or between the tubular layer or layers of plastics material and/or rubber.

3. The method according to claim 1, characterised by providing the spring metal wire with a covering of plastics material before it is formed into a coil by the coil-forming means.

4. The method according to claim 1, characterised in that the wire has a tensile strength of the order of 160kg/cm$^2$.

5. The method according to claim 1 characterized by helically winding a further extruded strip of a material selected from plastics material, natural rubber and synthetic rubber around said tubular layer while the tubular layer with the wire coil therearound is being axially advanced by the mandrel means, to form a second layer therearound, and bonding the two layers together.

6. The method according to claim 1, further characterized by extruding said strip with a groove extending along one face thereof, helically winding the extruded strip with said one face exposed radially outwards, and positioning the wire curved by the coil-forming means in the groove as the tubular layer is formed.

7. The method according to claim 6, characterized by extruding a second strip of said material with a groove along one face thereof, helically winding said second extruded strip while in heat-softened condition and with its grooved face facing radially inwards around said tubular layer while the tubular layer with the wire coil therearound is being axially advanced by the mandrel means, to form a second layer therearound and with the groove thereof embracing the wire and with the abutting turns bonded together, and bonding the two layers together.

8. Apparatus for making a hose or pipe comprising a helically wound tubular layer of material reinforced by a helical coil of wire, comprising rotatable mandrel means and extruder means for supplying the strip, and means for helically winding a strip of said material around the mandrel means with adjacent turns touching forming a tubular layer on said mandrel, coil-forming means disposed concentrically around the mandrel means for forming a helical coil from said wire, means for positively driving spring metal wire into said coil-forming means, said coil-forming means disposed entirely outside the coil to be formed and including two coil forming roller means disposed at spaced positions about the internal diameter of the coil to be formed and a device disposed between said forming roller means and adapted to engage and pull the inner periphery of the wire radially outwardly, while the coil is being formed, to give the wire a set, means for relatively adjusting said forming roller means and/or said pulling device in a radial direction to change the extent to which the wire is so flexed, and means for adjusting the linear speed at which the wire is driven into the coil-forming means relative to the linear speed at which the strip of said material is fed to the mandrel means.

9. Apparatus according to claim 8, characterized in that the coil-forming means also comprises means for adjusting the radial distance of the roller means from said axis, means disposed outside the internal diameter of the coil to be formed for adjusting the radial distance of said pulling device from said axis, and drive rollers for positively driving the wire into engagement with the forming roller means.

10. Apparatus according to claims 9, characterised in that the forming rollers have peripheral grooves and means are provided for adjusting the relative axial positions of the rollers to control the pitch of the wound coil, and pitch control means are provided which engage one or more turns of the formed coil to maintain the desired pitch of the turns around the tubular layer.

11. Apparatus according to claim 8, including means for feeding a further strip of a material selected from plastics material, natural rubber and synthetic rubber to the mandrel means in a position where it will overlie and be wound around the tubular layer and the wire coil therearound, and heating means being positioned to heat the surface of the tubular layer before said further strip is applied thereto.

* * * * *